United States Patent [19]

Terazawa

[11] 4,394,605
[45] Jul. 19, 1983

[54] LOAD DRIVE CONTROL SYSTEM

[75] Inventor: Hidehito Terazawa, Oobu, Japan

[73] Assignee: Nippondenso Co., Ltd., Kariya, Japan

[21] Appl. No.: 237,778

[22] Filed: Feb. 24, 1981

[30] Foreign Application Priority Data

Feb. 29, 1980 [JP] Japan .................. 55-25511

[51] Int. Cl.³ .................. H02P 1/22
[52] U.S. Cl. .................. 318/280; 318/256; 318/291; 318/469
[58] Field of Search ............... 318/453, 454, 469, 471, 318/450, 458, 266, 443, 369, 459, 265, 282, 256, 264, 280, 291; 343/711, 714, 901

[56] References Cited

U.S. PATENT DOCUMENTS

| 3,513,374 | 5/1970 | Koment | 318/266 |
| 3,891,909 | 6/1975 | Newson | 318/469 |
| 4,134,051 | 1/1979 | Pelchat et al. | 318/282 |
| 4,138,630 | 2/1979 | Graham | 318/282 X |
| 4,220,900 | 9/1980 | Mintz | 318/450 X |
| 4,272,708 | 1/1981 | Carle et al. | 318/266 |
| 4,328,451 | 5/1982 | Barge | 318/470 X |
| 4,338,552 | 7/1982 | Pilz et al. | 318/266 |

FOREIGN PATENT DOCUMENTS 53-10652 3/1978 Japan .

Primary Examiner—Ulysses Weldon
Attorney, Agent, or Firm—Cushman, Darby & Cushman

[57] ABSTRACT

A load drive control system for use with an automobile one-touch window glass or sunroof opening and closing system or antenna vertical movement control system includes a signal holding switching circuit responsive to an instruction signal for driving a reversible drive motor in the forward or reverse direction and also to a motor drive current detection signal and functioning to hold the forward or reverse rotation of the motor within a predetermined load range and emergency stopping the motor when the motor load current gets out of the predetermined range. It also includes a signal hold inhibiting circuit to permit a desired extent of motor rotation to be obtained according to the forward or reverse drive instruction signal.

13 Claims, 5 Drawing Figures

LOAD DRIVE CONTROL SYSTEM

BACKGROUND OF THE INVENTION

This invention relates to load-drive control systems, which permit the drive of a load in either one of two reversible directions to be caused and continued according to a temporarily-given instruction and stopped at the time when an increased load resistance is given, while it is stopped or reversed in direction when a separate instruction is given and, more particularly, load drive control systems of this kind which use a reversible DC motor as the load drive source. The invention is applicable for use with, for instance, an automobile window-glass vertical movement control system or so-called one-touch power window for automatically opening and closing automobile window glass in response to the operation of a switch, an automobile sunroof or antenna drive control system having similar operation or an automatic recording and reproducing system using magnetic tape or the like. The system of this sort generally comprises a DC motor for driving the load, a manual instruction switch, an electromagnetic or electric-operation holding element and a detecting element for releasing the holding state of the holding means in accordance with direct or indirect detection of an increase of the load resistance. As for the detecting element, various proposals have been made. For instance, a detecting element which makes use of changes of the motor load current is disclosed in Japanese Utility Model Publication No. 10652/1978.

SUMMARY OF THE INVENTION

The invention is predicated in a method of making use of the motor load current (i.e., motor drive current) as in the afore-mentioned prior art example, and its object is to provide a load drive control system which is systematically provided with several effective functions and has a higher utility.

According to the invention, there is provided a load drive control system of a simple circuit, in which the operative state of driving the load is held or released in accordance with a detection signal which is produced when a motor load resistance increase is detected in response to an increase of the voltage drop across a low resistance resistor means inserted in the motor load current path and also in accordance with another detection signal which is produced through the detection of the generation and vanishment of the voltage drop across the afore-mentioned resistor means according to motor-drive instructions.

According to the invention, various safety switches can be very readily incorporated to enable the system to effect the respective safety side operations and it is thus possible to provide a highly versatile load drive control system capable of use in combination with various safety switches.

DESCRIPTION OF THE PREFERRED EMBODIMENT

Now, the first to third embodiments of the invention applied to automatic automobile window-glass vertical movement control will be described with reference to the accompanying drawings.

Figure 1:
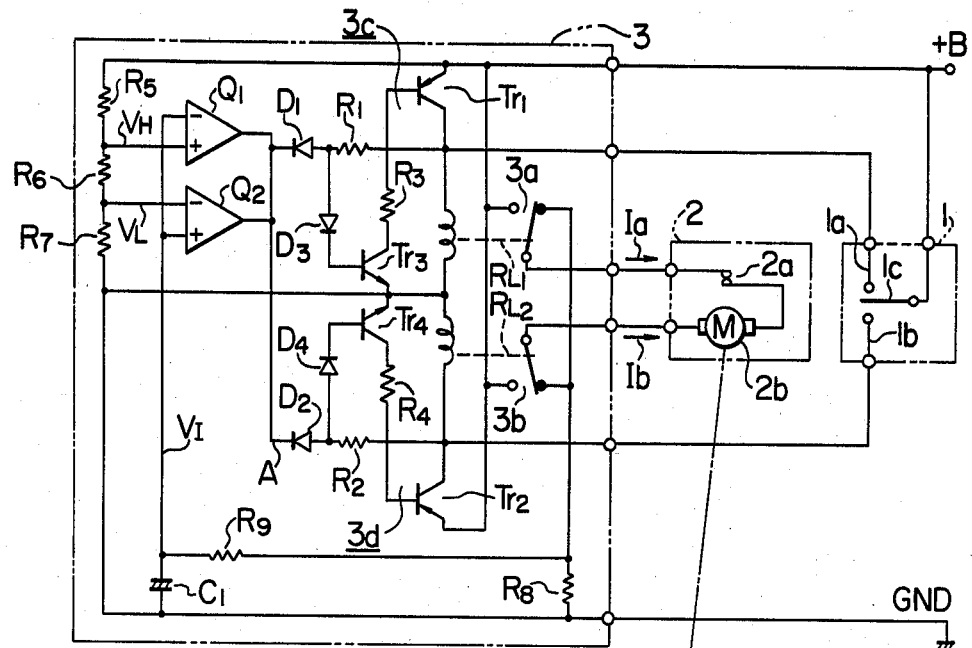
FIG. 1 is a circuit diagram showing a first embodiment of the load drive control system according to the invention.

FIG. 1 shows a circuit diagram of the first embodiment. Referring to the Figure, designated at 1 is a manual switch, which is provided on an automobile door or instrument panel at a predetermined position thereof and has an "up" instruction selecting contact 1a for raising a window glass, a "down" instruction selecting contact 1b for lowering the window glass and a movable contact 1c. The movable contact 1c is normally in its neutral position as is shown. When the switch is operated, it is electrically connected to either one of the selecting contacts 1a and 1b, and with removal of the switch operating force it is restored to the initial neutral position by itself. As an alternative, the manual switch may have a structure where the selecting contacts 1a and 1b are self-restoring movable contacts and can be selectively connected to the neutral contact 1c which is a fixed contact.

Designated at 2 is a two-brush type ferrite motor, the direction of rotation of which is determined by the direction of current supplied thereto. The output shaft of the motor 2 is coupled to a link mechanism (not shown) of a well-known structure for raising and lowering the automobile door window glass. The motor 2 carries a normally closed bimetal switch 2a which opens in response a heat generated by the motor. Namely, when the thermal capacity of the switch is exceeded by a heat generated by the motor, the bimetal opens the power supply loop for the motor itself 2b. The motor 2 is of the type having such a load characteristic that its load current is several amperes at the time of the usual window-glass driving and is several ten amperes when the resistance offered to the load is increased at the time when the window glass is brought to its fully-open or fully-closed position or when the window-glass undergoes an external force on the way of its moving operation. Designated at 3 is a control box accommodating an electric control circuit, and at 6 an automobile door, whose window glass 6a is coupled to the motor 2 for being vertically moved thereby. The electric control circuit includes relay movable contacts 3a and 3b of relay switches as electric switch means for selectively connecting the two brushes of the motor 2 respectively to the positive terminal +B and grounded negative terminal GND of a power supply battery mounted in the automobile. The relay movable contacts 3a and 3b change their states of connection with normally-closed contact and with normally-open contact as respectively associated relays $RL_1$ and $RL_2$ are energized and de-energized. When the movable contact 3a contacts the power supply side normally-open contact with the energization of the relay $RL_1$, a current as shown by arrow Ia is caused to flow through the motor 2, and the window glass 6a is driven upwards (i.e., in the closing direction) by the torque from the motor. When the movable contact 3b contacts the power supply side normally open contact with the energization of the relay $RL_2$, a current as shown by arrow Ib is caused to flow through the motor 2 so as to rotate the motor in the reverse direction, whereby the window glass 6a is driven downwards (i.e., in the opening direction).

Designated at $R_8$ is a detecting resistor having a very small resistance and connected at one end to the grounded terminal GND of the battery and at the other end to the normally closed contacts of the relay switches. When the rlay movable contacts 3a and 3b are complementarily connected to the power supply side as mentioned above, i.e., when either one of the movable contacts is connected to the power supply side normally-open contact, a slight voltage drop is produced across the resistor $R_8$ by the current caused from the power supply terminal +B through the relay contact 3a or 3b, motor 2 and resistor $R_8$. The resistance of the resistor $R_8$ is very small, specifically slightly above ten milliohms, so that the power consumption to the motor 2 is very low, and yet the terminal voltage across this resistor is practically proportional to the current through the motor 2.

A resistor $R_9$ and a capacitor $C_1$ constitute a filter for absorbing high frequency components of the voltage drop across the resistor $R_8$ that are produced due to brush noise stemming from the rotation of the motor 2 or sudden variations of the power supply voltage. A steady DC voltage $V_I$ free from the above-mentioned high frequency components and proportional to the terminal voltage across the detecting resistor $R_8$, is produced at the juncture between the resistor $R_9$ and capacitor $C_1$. The time constant of this filter is set such that a response delay of several hundred miliseconds is provided with respect to a stepwise change of the terminal voltage across the detecting resistor $R_8$.

Designated at $Q_1$ and $Q_2$ are voltage comparators connected as a so-called window comparator. This comparator compares the afore-mentioned smoothed voltage $V_I$ obtained through the resistor $R_9$ and capacitor $C_1$ with two preset voltages, namely high and low reference voltages $V_H$ and $V_L$ provided by voltage dividing resistors $R_5$, $R_6$ and $R_7$. If the voltage $V_I$ compared is lower than the first preset voltage $V_L$, which is set to a value corresponding to about one ampere of current flowing through the motor 2, the output from output terminal A of the voltage comparator $Q_2$ is at a low level. If the voltage $V_I$ is higher than the second preset voltage $V_H$ which is set to a value corresponding to more than ten amperes of current flowing through the motor 2, the output signal from the output terminal A of the voltage comparator $Q_1$ is at a low level. If the above conditions are not met, the output terminal A of the voltage comparators $Q_1$ and $Q_2$ are at an open level.

Transistors $Tr_1$ and $Tr_3$, resistors $R_1$ and $R_3$, diodes $D_1$ and $D_3$ and relay coil of the first relay $RL_1$ constitute a control circuit 3c for driving and holding the relay contact 3a. More particularly, when the movable contact 1c of the manual switch 1 makes contact with the "up" instruction selecting contact 1a, the relay coil of the relay $RL_1$ is immediately energized to switch the relay contact 3a to the normally-open contact side. If the afore-mentioned outputs of the output terminals A of the window comparators $Q_1$ and $Q_2$ are at the open level, a base current to the transistor $Tr_3$ is caused to flow through the resistor $R_1$ and diode $D_3$, thus turning on the transistor $Tr_3$. As a result, a base current to the transistor $Tr_1$ is caused to flow through the resistor $R_3$, thus turning on the transistor $Tr_1$. With the collector current in the transistor $Tr_1$ thus caused, the relay coil of the $RL_1$ is energized. At the same time, since the base current to the transistor $Tr_3$ is supplied, even after the restoration of the neutral state of the manual switch 1 the transistors $Tr_1$ and $Tr_3$ are held "on" to hold the relay $RL_1$ energized.

Transistors $Tr_2$ and $Tr_4$, resistors $R_2$ and $R_4$, diodes $D_2$ and $D_4$ and the relay coil of the second relay $RL_2$ constitute a control circuit 3d for driving and holding the second relay $RL_2$. In this control circuit 3d, like the afore-mentioned control circuit 3c, with the closure of the movable contact 1c of the manual switch 1 to the "down" instruction selecting contact 1b the transistors $Tr_2$ and $Tr_4$ are triggered on to energize the relay $RL_2$ and hold the relay 3b with the closure of the normally-open contact.

The diodes $D_1$ and $D_2$ serve as current blocking diodes to ensure independent operations of both the control circuits 3c and 3d.

Now, the operation of the first embodiment of the above arrangement will be described. When the manual switch 1 is operated to the "up" side in the fully-open state of the window glass 6a, the movable contact 1c makes contact with the selecting contact 1a to energize the first relay $RL_1$, whereby the relay contact 3a is thrown to the normally-open contact side to cause the rotation of the motor 2 in the direction of raising the window glass 6a. As soon as the motor 2 is started, its load current reaches several amperes, so that the outputs of the output terminals A of the window comparators $Q_1$ and $Q_2$ is brought to the open level in response to the terminal voltage across the detecting resistor $R_8$. As a result, in the control circuit 3c the transistor $Tr_3$ is triggered on to trigger the transistor $Tr_1$, whereby the first relay $RL_1$ is held in the energized state so that the motor 2 continuously drives the window glass 6a upwards even after release of the operating force from the manual switch 1.

When the window glass 6a reaches its upper set position in the window frame, i.e., is brought to the fully-closed position, or undergoes an external force tending to prevent its upward movement, at which time the motor 2 is mechanically locked, a load current called lock current of several ten amperes is caused to flow through the motor 2. As a result, the voltage drop across the detecting resistor $R_8$ is increased to invert the input condition of the voltage comparator $Q_1$, thus changing its output level, i.e., output of the output terminal A of the window comparator, to the low level. Consequently, the diode $D_1$ is forwardly biased to bypass the base current to the transistor $Tr_3$, thus cutting off the transistor $Tr_3$ to cut off the transistor $Tr_1$ so as to de-energize the relay $RL_1$. In this way, power supply to the motor 2 is discontinued, and the window glass 6a is stopped at this time and held at that position.

When the manual switch 1 is operated to the "down" side in this state, the movable contact 1c makes contact with the selecting contact 1b to energize this time the second relay $RL_2$, thus causing the rotation of the motor 2 in the direction of lowering the window glass 6a. With the motor load current produced at this time, the output at the output terminal A of the window comparator ($Q_1$, $Q_2$) is brought to the open level in response to the voltage drop across the detecting resistor $R_8$. Thus, the self-sustaining state of the control circuit 3d is set up, so that even by subsequently removing the operating force to the manual switch 1 the second relay $RL_2$ is held energized to continuously permit the rotation of the motor 2 to lower the window glass.

When the window glass $6a$ reaches its lower set position in its frame, i.e., is brought to the fully-open position, or undergoes an external force tending to prevent the downward movement, at which time the motor 2 is mechanically locked, the motor load current is increased so that the output of the output terminal A of the window comparator ($Q_1$, $Q_2$) is brought to the low level to forwardly bias the diode $D_2$. As a result, the holding state of the control circuit $3d$ is released to de-energize the relay $RL_2$. In this way, power supply to the motor 2 is discontinued, and the window glass $6a$ is stopped at this time and held at that position.

Now, the operation takes place such that the manual switch 1 is operated to the "down" side while the window glass $6a$ is being raised with the operation of the motor 2. With the window glass in upward movement, an usual load current of several amperes as mentioned earlier is flowing through the motor 2 and detecting resistor $R_8$, and the output terminal A of the window comparator ($Q_1$, $Q_2$) is at the open level. Also, the control circuit $3c$ is in the self-sustaining state to hold the first relay $RL_1$ energized, and the manual switch 1 is in its neutral position. As soon as the manual switch 1 is operated to the "down" side in this state, the second relay $RL_2$, is energized. At this time the control circuit $3d$ is going to hold the second relay $RL_2$ energized since the output terminal A of the window comparator ($Q_1$, $Q_2$) is at the open level. However, since both the brushes of the motor 2 are connected through the contacts $3a$ and $3b$ to the power supply terminal +B, the motor 2 is immediately stopped by dynamic braking. At the same time, current through the detecting resistor $R_8$ vanishes, and as a result the output terminal A of the window comparator ($Q_1$, $Q_2$) is brought to the low level after the lapse of a period (about several-hundred milliseconds) determined by the time constant of the circuit constituted by the capacitor $C_1$ and resistor $R_9$. (The resistance of the detecting resistor $R_8$ is very low and is ignored.) Thus, the self-sustaining state of both the control circuits $3c$ and $3b$ are released by the diodes $D_1$ and $D_2$.

The relay $RL_2$, which can be energized by the transistor $Tr_2$ of the control circuit $3d$, can also be energized by the manual switch 1. If the period of persistence of the contact between the movable contact $1c$ and selecting contact $1b$ with the manual switch 1 set to the "down" side is shorter than the afore-mentioned period of about several-hundred milliseconds, the relay $RL_2$ will not be energized again. Even if it is momentarily energized, the window comparator ($Q_1$, $Q_2$) will not respond to this energization since only a very small current flows through the detecting resistor $R_8$. Thus, the self-sustaining state of the control circuit $3d$ is not brought about again, and the relay $RL_2$ is deenergized. In this case, the motor 2 is no longer rotated, so that the window glass $6a$ is stopped at that position.

When the operation of the manual switch 1 is to the "down" side (closure of the contacts $1b$ and $1c$) is continued for a sufficient period, the relay $RL_2$ is energized for a sufficient period by the switch 1 with the control circuits $3c$ and $3d$ held out of the self-sustaining state to attain connection of the movable contact $3b$ to the power supply terminal +B. When this connection is attained, a current shown by arrow $I_b$ is caused to flow through the motor 2, thus starting the rotation of the motor 2 again to lower the window $6a$ this time. At this time, with the load current flowing through the motor 2 the window comparator ($Q_1$, $Q_2$) responds to the voltage drop across the detecting resistor $R_8$. Thus, the self-sustaining action of the control circuit $3d$ is brought about to hold the relay $RL_2$ energized, and even after the subsequent restoration of the neutral position of the manual switch 1 the window glass $6a$ is continuously lowered by the motor 2 until it reaches its lowest position in the frame or until a strong external force is exerted to it.

When the manual switch 1 in its neutral position is operated to the "up" side while the window glass $6a$ is being lowered, the same operation as described above takes place. The self-sustaining state of the control circuits $3c$ and $3d$ are once released and whether the control circuit $3c$ is subsequently held out of or brought again to the self-sustaining state is determined depending upon the period during which the manual switch 1 is operated, and whether the motor 2 is stopped or reversely rotated is determined.

It will be appreciated that the upward or downward movement, stopping, and reversal movement of the window glass $6a$ can be freely controlled by operating the manual switch 1.

When the motor 2 is overheated due to a larger current caused by a trouble or fault caused in the control circuit 3 or wiring or a slip of the link mechanism while it is being driven in either direction, the bimetal switch $2a$ mounted on the motor 2 is opened to stop the motor 2. Also, the thermal capacity of the bimetal $2a$ is preselected such that it is opened when the motor load current is continued for a long time in a range, in which the window comparator ($Q_1$, $Q_2$) gives no response, due to the load of window glass or linkage mechanism loaded on the motor 2 or due to the action of external applied forces. Further, once the bimetal switch $2a$ is opened, the voltage drop across the detecting resistor $R_8$ vanishes and, as a result, the window comparator ($Q_1$, $Q_2$) releases the sustaining action of the control circuits $3c$ and $3d$. Thus, unexpected movement of the window glass $6a$ caused due to sudden start of the motor 2 at the time of the restoration of the bimetal switch $2a$ can be prevented.

Further, a separate manual switch, if connected in series with the power supply path to the motor 2, may have the function of releasing the self-sustaining state of the control circuit $3c$ or $3d$ like the afore-mentioned bimetal switch $2a$, and it may be provided as a stop switch together with the manual switch 1 on the same operation panel.

Figure 2:
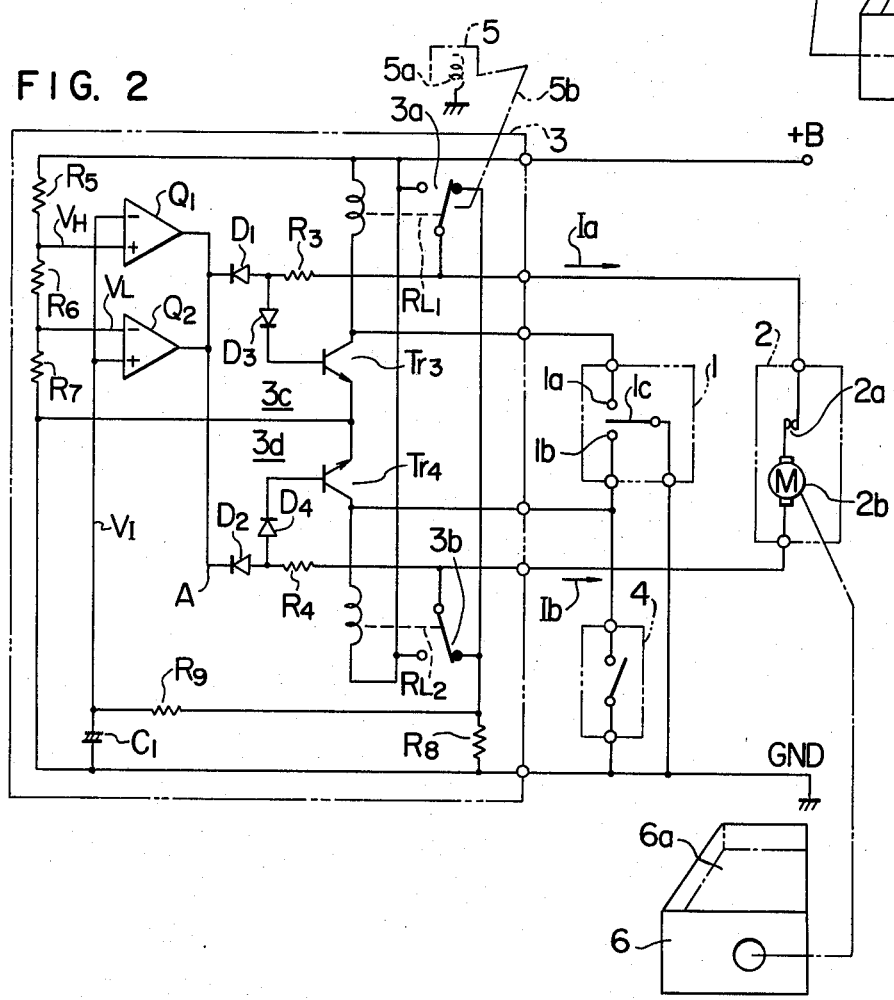
FIG. 2 is a circuit diagram showing a second embodiment of the invention.

FIG. 2 shows a circuit diagram of a second embodiment of the invention. This second embodiment is different from the preceding first embodiment in that the arrangement of the control circuits $3c$ and $3d$ for controlling the respective relay switches $RL_1$ and $RL_2$ is simplified and that a pressure sensitive switch 4 is additionally provided. Like the first embodiment, the basic operation of the control circuits $3c$ and $3d$ is practically the same, and the operation of the control circuit $3c$ is explained as an example. As soon as the manual switch 1 is driven to the "up" side, the relay coil of the relay $RL_1$ is immediately energized to connect the relay contact $3a$ to the power supply terminal +B, thus starting the rotation of the motor 2. When the output terminal A of the window comparator ($Q_1$, $Q_2$) is subsequently brought to the open level to cause cessation of the forward bias of the diode $D_1$, a base current of the transistor $Tr_3$ is caused through the relay contact $3a$, resistor $R_3$ and diode $D_3$ to turn on the transistor $Tr_3$, and the relay $RL_1$ is thus held energized. When the current flowing through the detecting resistor $R_8$ is increased to a predetermined value or ceases in this state, the output terminal A of the window comparator ($Q_1$, $Q_2$) is brought to the low level, the base current of the transistor $Tr_3$ is bypassed by the diode $D_1$, and thus the self-sustaining state is released. The control circuit $3d$ operates in the same way. It is to be appreciated that the control circuits $3c$ and $3d$ in the second embodiment are simplified compared to those in the first embodiment in that the function of the transistors $Tr_1$ and $Tr_2$ in the first embodiment are fulfilled by the function of the relays $RL_1$ and $RL_2$ in the second embodiment.

The pressure sensitive switch 4 is adapted such that it is closed when a pressure is applied to the edge of the window glass 6a by an obstacle, for instance a hand, inserted into the space between the window glass edge and window frame while the window glass 6a is being raised. This kind of pressure sensitive switch 4 is well known, for instance as disclosed in Japanese Utility Model Publication No. 33778/1974 and Japanese Patent Publication No. 44445/1973. The switch 4 is connected across the "down" instruction selecting contact 1b and movable contact 1c of the manual switch 4, and it acts as a "down" instruction switch.

Now, the operation of the second embodiment will be described mainly in connection with the function of the pressure sensitive switch 4. Similar to the above first embodiment, in this second embodiment the upward and downward movements, stop, and reversal movement of the window glass 6a with the forward and reverse rotation and stop of the motor 2 are controlled by operating the manual switch 1.

When the window glass 6a is being moved in the closing direction with the rotation of the motor 2 with the relay $RL_1$ held energized by the control circuit $3c$ as a result of the operation of the manual switch 1 to the "up" side, with a pressure applied to the edge of the window glass 6a the pressure sensitive switch 4 is closed. With the closure of the pressure sensitive switch 4, substantially the same state as that obtained by operating the manual switch 1 to the "down" side is brought about. More specifically, with the closure of the switch 4 the relay $RL_1$ is immediately energized to connect the relay contact 3b to the power supply terminal +B, whereby the motor 2 is immediately stopped by dynamic braking. At the same time, the current flowing through the detecting resistor $R_8$ ceases, and the DC voltage $V_I$ applied from the filter circuit ($C_1$, $R_9$) to the window comparator ($Q_1$, $Q_2$) becomes lower than the reference voltage $V_L$ after the lapse of several hundred milliseconds. As a result, the output terminal A is brought to the low level to release the self-sustaining action of the control circuit $3a$, thus switching the relay contact $3a$ to the normally-closed contact side (i.e., ground side).

Meanwhile, while the pressure sensitive switch 4 is still in the closed state, the relay $RL_2$ is continuously energized by the current flowing through the switch 4. Thus, the motor 2 turns to be rotated in the direction of lowering the window glass 6a by the current as shown by arrow Ib, and the output terminal A of the window comparator ($Q_1$, $Q_2$) is brought to the open level in response to the voltage drop produced across the detecting resistor $R_8$ by the current to bring about the self-sustaining state of the control circuit $3d$. The relay $RL_2$ is held energized until the window glass is lowered to the fully closed position. With the resultant increase of the load current through the motor 2 the self-sustaining state is released, thus stopping the motor 2, and hence stopping the window glass 6a.

Figure 3:
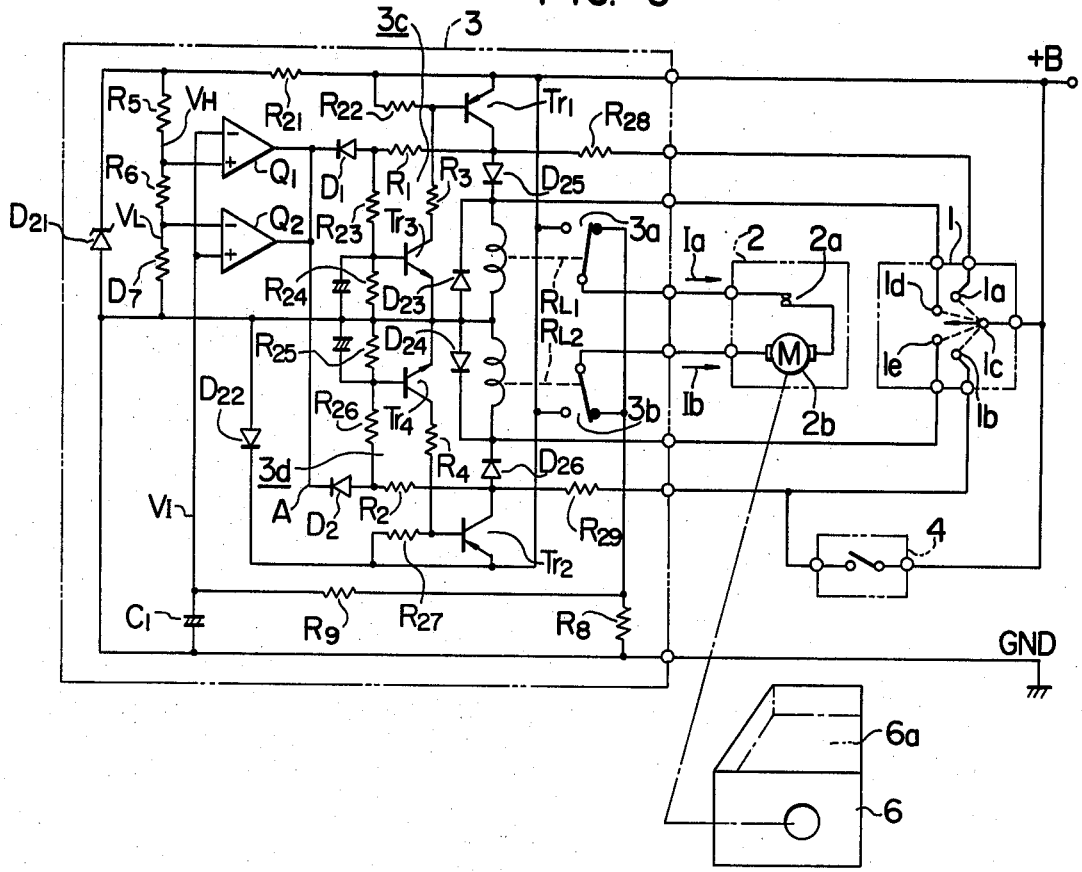
FIG. 3 is a circuit diagram showing a third embodiment of the invention.

FIG. 3 shows a circuit diagram of a third embodiment of the invention. This embodiment is different from the preceding first and second embodiments in that the manual switch has, in addition to the "up" and "down" instruction contacts 1a and 1b, "up" and "down" contacts 1d and 1e for maintaining the respective upward and downward movements of the window glass 6a, in that the control circuit make different response by the operation of the manual switch, and in that consideration for coping with noise and surge voltages are given to the circuit elements of the circuit in the control box 3.

Now, the operation of the third embodiment will be described in connection with the operation of the manual switch 1. The operation of the control circuit 3 and motor 2 when the movable contact c of the manual switch 1 makes contact with the selecting contact 1a or 1b is basically the same as in the previous first embodiment. In this case, the current for energizing the relay switch $RL_1$ or $RL_2$ first flows from the selecting contact 1a or 1b of the switch 1 through a diode $D_{25}$ or $D_{26}$. After the output terminal A of the window comparator ($Q_1$, $Q_2$) is brought to the open level with the operation of the motor 2, the transistor $Tr_3$ (or $Tr_4$) is triggered by a bias voltage supplied through resistors $R_1$, $R_{23}$ and $R_{24}$ (or $R_2$, $R_{25}$ and $R_{26}$) to turn on the transistor $Tr_3$ and $Tr_1$ (or $Tr_4$ and $Tr_2$), so that the energizing current is now supplied from the transistor $Tr_1$ (or $Tr_2$). Thus, it is now ready to bring about the self-sustaining state of the control circuit $3c$ and $3d$ by the movable contact 1c and selecting contact 1a or 1b of the manual switch 1, and when a predetermined load current is caused to flow through the motor the self-sustaining state is realized to hold the operative state of the motor 2 for raising or lowering the window glass 6a.

When the movable contact 1c of the manual switch 1 makes contact with the "up" contact 1d or "down" contact 1e, an energizing current is caused to flow through the relay $RL_1$ or $RL_2$ during this closure period. During this period, the relay contact 3a or 3b is connected to the power supply side, and the motor 2 is thus rotated to raise or lower the window glass 6a. In this case, even when the output terminal A of the window comparator ($Q_1$, $Q_2$) is brought to the open level with the generation of the load current flowing through the motor 2, the self-sustaining state of the control circuit $3c$ or $3d$ is not brought about since the diode $D_{25}$ or $D_{26}$ blocks the bias voltage from being impressed upon the transistor $Tr_3$ or $Tr_4$. Therefore, as soon as the manual switch 1 is switched to the neutral position, the relay $RL_1$ or $RL_2$ is de-energized to stop the motor 2. It is to be appreciated that the "up" or "down" contact 1d or 1e permits the window glass 6a to be raised up or lowered down to a desired position.

It is to be noted that when the manual switch 1 is set to the position of the "down" to "up" contact 1e or 1d while the window glass 6a is being raised or lowered with the rotation of the motor 2, the self-sustaining state of the control circuit $3c$ or $3d$ can be released. This can be so because when the contact 1e or 1d is made contact with the movable contact while the relay $RL_1$ or $RL_2$ is energized, the other relay $RL_2$ or $RL_1$ is also energized, thus causing cessation of the current flowing through the detecting resistor $R_8$ to render the output terminal A of the comparator ($Q_1$, $Q_2$) to the low level.

Figure 4:
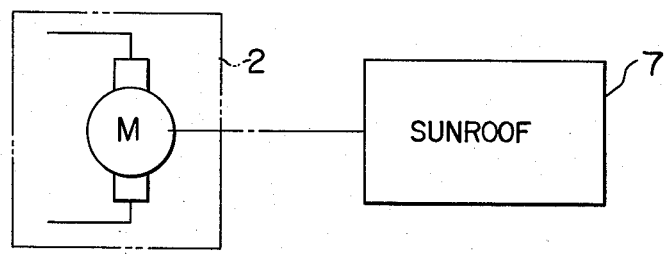
FIG. 4 is a view showing a further embodiment of the invention applied to the automobile sunroof drive.
Figure 5:
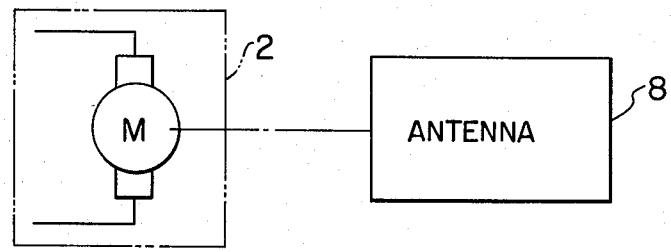
FIG. 5 is a view showing a further embodiment of the invention applied to the automobile antenna drive.

FIG. 4 shows a fourth embodiment of the invention applied to the on-off control of a sunroof 7, and FIG. 5 shows a fifth embodiment of the invention applied to the vertical-movement control of an antenna 8.

While the first to fifth embodiments of the invention have been described above, they are by no means limitative, and various changes and modifications are possible, several of which are shown hereunder.

The manual switch 1 as the instruction means for selecting the direction of rotation of the motor 2 may be replaced with other mechanical means. For example, instead of the manual switch 1 in the second embodiment of FIG. 2, a push button 5 spring-biased by a spring 5a may be provided such that when it is depressed the relay switch 3a is switched to the normally-open contact side through a uni-directional action link mechanism 5b. With this arrangement, by depressing the push button 5 the relay switch 3a is switched to the normally-open contact side to cause rotation of the motor 2. By the response of the window comparator ($Q_1$, $Q_2$) the bias current of the transistor $Tr_3$ is supplied through the relay contact 3a, resistor $R_3$ and diode $D_3$ so that the relay $RL_1$ is held energized. Thus, when the push button 5 is subsequently released and brought back to the initial position by the spring 5a, the relay switch 3a is held in its state of connection to the normally-open contact side. Similar operating means may be provided for the relay switch 3b.

Also, the first and second relays $RL_1$ and $RL_2$ may be replaced with semiconductor switching elements such as transistors.

Further, while the window comparator ($Q_1$, $Q_2$) formed as a voltage responsive means has been formed by using two voltage comparators, the use is made of a commercially-available IC comparator or a voltage comparator circuit formed by using semiconductor switching elements such as transistors. In general, any arrangement can be employed inasmuch as it can produce different output signals respectively when the input voltage $V_I$ is lower than the first reference value, when the input voltage is higher than the second reference value and when the input voltage has an intermediate value between the two reference values.

As has been described in the foregoing, since according to the invention the self-sustaining state of supplying a current to the motor is controlled through the detection of the increase of the motor load and motor rotation according to the voltage drop across a resistive means inserted in the motor load current path, the driving of the load can be reliably started and stopped according to instructions. In addition, since the arrangement includes common parts that are operative for the reversed operation of the load, it is possible to simplify the arrangement.

What is claimed is:

1. A load drive control system comprising:
   instruction means for selectively producing forward and reverse drive instruction signals for starting the driving of a controlled load in forward and reverse directions respectively;
   signal holding switching means for holding a forward or reverse signal corresponding to the forward or reverse drive instruction signal from said instruction means;
   said instructions means comprising an automatically-restoring switch which switches by receiving an actuation force to generate one of said instruction signals and restores when the actuation force is released to stop the generation of the one instruction signal;
   reversible motor means for driving said load in either forward or reverse direction;
   means responsive to said signal holding switching means for controlling electric current supplied from a power supply to said motor means;
   current detecting means for detecting the magnitude of the current supplied to said motor means;
   and upper and lower limit detecting means responsive to said current detecting means for releasing the holding action of said holding switching means when the motor supplied current becomes higher or lower than an upper or lower limit respectively.

2. A load drive control system according to claim 1, wherein said signal holding switching means includes first switching means for defining a forward drive circuit for driving said motor means in the forward direction, second switching means for controlling the on-off operation of said first switching means in response to said limit detection signal and the opening and closing operation of said first switching means, a third switching means for defining a reverse drive circuit for driving said motor means in the reverse direction in response to said reverse drive instruction signal, and fourth switching means for controlling the on-off operation of said third switching means in response to said limit detection signal and the opening and closing operation of said third switching means.

3. A load drive control system according to claim 1, which further comprises abnormal load detecting and stopping means coupled between the power supply and said motor means for detecting abnormal loads on said motor means and interrupting current supply to said motor means for urgently stopping said motor means upon detection of an abnormal load.

4. A load drive control system according to any one of claim 1, which further comprises means for inhibiting the holding action of said holding switching means, and means for holding said forward and reverse signal only during the presence of said respective forward and reverse drive instruction signals.

5. A load drive control system according to any one of claim 1, wherein said instruction means includes a push button switch having a normally open-contact.

6. A load drive control system comprising:
   instruction means for selectively producing forward and reverse drive instruction signals for starting the driving of a controlled load in forward and reverse directions respectively;
   signal holding switching means for holding a forward or reverse signal corresponding to the forward or reverse drive instruction signal from said instruction means;
   said instruction means comprising an automatically-restoring switch which switches by receiving an actuation force to generate one of said instruction signals and restores when the actuation force is released to stop the generation of the one instruction signal;
   reversible motor means for driving said load in either forward or reverse direction;
   means responsive to said signal holding switching means for controlling electric cirrent supplied from a power supply to said motor means;
   current detecting means for detecting the magnitude of the current supplied to said motor means;

and upper and lower limit detecting means responsive to said current detecting means for releasing the holding action of said holding switching means when the motor supplied current becomes higher or lower than an upper or lower limit respectively; and wherein said signal holding switching means includes first switching means for defining a forward drive circuit for driving said motor means in the forward direction, second switching means for enabling and disabling said first switching means respectively in response to said forward drive instruction signal and said limit detection signal, third switching means for defining a reverse drive circuit for driving said motor means in the reverse direction, and fourth switching means for enabling and disabling said third switching means respectively in response to said reverse drive instruction signal and said limit detection signal.

7. A load drive control system according to claim 2, wherein said first and third switching means include respective first and second relay means each having a normally-open contact and a normally-closed contact and respective holding means for holding the respectively associated relay means energized in response to said second and fourth switching means, said first relay means functioning to form a power supply circuit for supplying power from the power supply to said motor means through its normally-open contact, said motor means and the normally closed contact of said second relay means; and said second relay means functioning to form a power supply circuit for supplying power from the power supply to said motor means through its normally-open contact, said motor means and the normally-closed contact of said first relay means.

8. A load drive control system comprising:
 a reversible motor for driving a mechanical load in either forward or reverse direction depending upon the direction of current flowing between its two brushes, the load current through said reversible motor varying according to resistance of said mechanical load;
 instruction means for generating an instruction for selecting the direction of driving of said reversible motor;
 first and second electric switch means for selectively effecting electric connection of the respective brushes of said reversible motor to the opposite terminals of a DC power supply;
 a current detecting resistor means for producing a voltage drop according to the load current caused through said reversible motor when a complementary connection of the brushes of said reversible motor to the opposite terminals of the DC power supply is made by said first and second electric switch means;
 voltage responsive means responsive to the voltage drop across said resistor means and producing a detection signal when said voltage drop is lower than a first predetermined level and also when said voltage drop is higher than a second predetermined level higher than said first predetermined level; and
 control means responsive to said instruction means and also to said voltage responsive means and functioning to achieve the electric connection of said first and second electric means in response to said instruction from said instruction means and holding said electric connection during the absence of said detection signal from said voltage sensitive means, said instructions means comprising an automatically-restoring switch which switches by receiving an actuation force to generate said instruction signal and restores when the actuation force is released to stop the generation of said instruction signal.

9. A load drive control system according to claim 8, wherein said voltage responsive means includes a filter circuit having a resistor and a capacitor for removing high frequency components in the voltage drop produced across said resistor means and a window type comparator circuit having said first and second predetermined levels as reference voltages.

10. A load drive control system according to claim 8, wherein said reversible motor includes a thermosensitive switch operative in response to heating and interrupting the load current when heat generation reaches a predetermined level.

11. A load drive control system according to claim 8, wherein said resistor means is a resistor connected at one end to one of the terminals of the DC power supply and at the other end to one of two power supply side terminals of said first and second electric switch means on the side of the afore-said one of the DC power supply terminals.

12. A load drive control system according to any one of claims 1, 2 or 8, which is used for controlling the opening and closing of an automobile sunroof.

13. A load drive control system according to any one of claims 1, 2 or 8, which is used for controlling the vertical movement of an automobile antenna.

* * * * *